United States Patent [19]

Toda

[11] Patent Number: 4,930,723
[45] Date of Patent: Jun. 5, 1990

[54] BRAKING FORCE MEASURING MECHANISM FOR A SPINNING REEL

[75] Inventor: Junichi Toda, Sakai, Japan

[73] Assignee: Shimano Industrial Company Limited, Osaka, Japan

[21] Appl. No.: 330,362

[22] Filed: Mar. 29, 1989

[30] Foreign Application Priority Data

Mar. 30, 1988 [JP] Japan .................. 63-42166[U]

[51] Int. Cl.⁵ .................. A01K 89/01; A01K 89/02
[52] U.S. Cl. .................. 242/245; 242/246; 242/285; 242/223
[58] Field of Search .................. 242/245, 246, 223, 285

[56] References Cited

U.S. PATENT DOCUMENTS

| 4,391,419 | 7/1983 | Iwama et al. | 242/245 |
| 4,601,437 | 7/1986 | Yoshikawa | 242/245 |
| 4,702,431 | 10/1987 | Kaneko | 242/245 X |
| 4,804,150 | 2/1989 | Takeuchi | 242/245 |

FOREIGN PATENT DOCUMENTS 60-168375 11/1985 Japan .

Primary Examiner—Katherine A. Matecki
Attorney, Agent, or Firm—Dickstein, Shapiro & Morin

[57] ABSTRACT

A braking force measuring mechanism is provided which includes a blocking member provided within a skirt of a spool for blocking rotation of the spool relative to a braking side member and an operating member provided at the outer periphery of the skirt for engaging or disengaging the blocking member with or from a retaining portion provided at the braking side member.

6 Claims, 3 Drawing Sheets

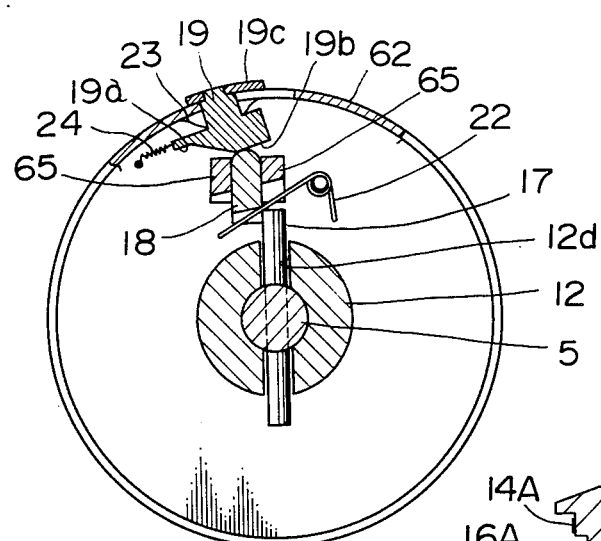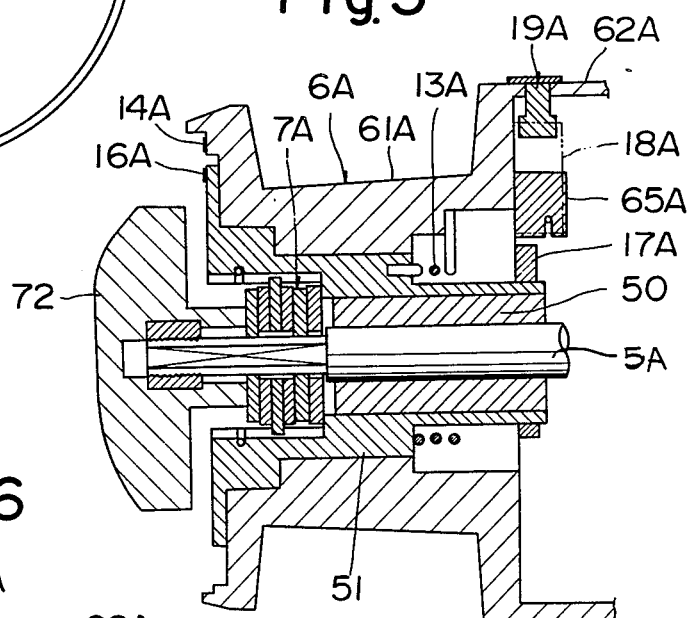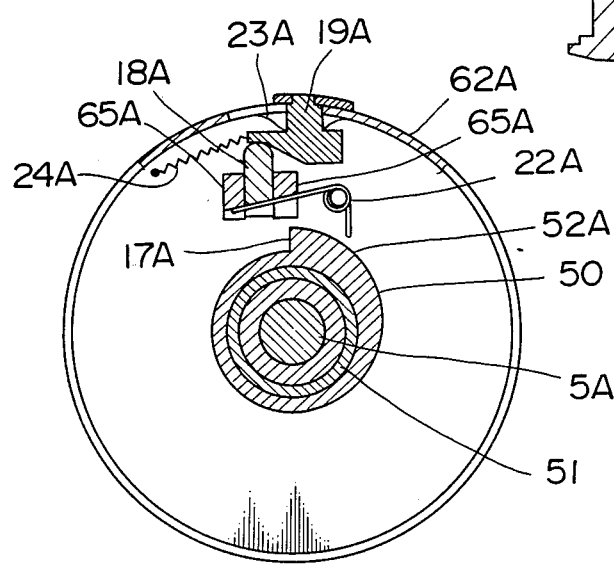

BRAKING FORCE MEASURING MECHANISM FOR A SPINNING REEL

FIELD OF THE INVENTION

The present invention relates to a braking force measuring mechanism for a spinning reel, and more particularly, to a braking force measuring mechanism for measuring the braking force set by a drag mechanism provided at the spinning reel.

BACKGROUND OF THE INVENTION

Generally, a conventional spinning reel, as disclosed in, for example, Japanese Utility Model Laid-Open Gazette No. Sho 60-168375, includes a spool which is supported to a spool shaft and on which a fishing line is wound, so that the spool may rotate together with the spool shaft with respect to a reel body, and further includes a drag mechanism provided between the spool shaft and the reel body for exerting a braking effect against rotation of the spool.

The above-described drag mechanism is a so-called rear drag mechanism which is provided at the rear of the reel body. A so-called front drag mechanism is also well-known which includes a spool shaft supported to be non-rotatable and axially movable with respect to the reel body, a spool supported to rotate relative to the spool shaft, and a drag mechanism provided between the spool and the spool shaft.

In either of the above types of drag mechanisms, an adjustor at the drag mechanism is rotatably operated to adjust a braking force set by the drag mechanism so as to exert a predetermined braking effect against rotation of the spool, the adjustor being rotated to previously set the braking force corresponding to a kind of fish desired to be caught.

U.S. Patent Application Ser. No. 195,909 discloses a braking force measuring mechanism for measuring the braking force set by the drag mechanism of a spinning reel.

This braking force measuring mechanism is constructed such that a spool is rotatably supported through a spool holder to the spool shaft subjected to the braking action by the drag mechanism, and an elastic member is provided between the spool and the spool holder for biasing the spool in a direction opposite to the direction of drawing out the fishing line from the spool. A pointer is provided at one of the spool and the spool holder and a dial with a scale indicating the braking force is provided at the other. A retaining recess is provided at the front surface of the spool, and at the spool holder is provided a blocking member engageable with or disengageable from the retaining recess and engaging therewith to lock the spool with respect to the spool holder in the direction of drawing out the line from the spool. The blocking member is released to rotate the spool against the elastic member in the direction of drawing out the line, thereby enabling easy measurement of the braking force set by the drag mechanism, and engages with the retaining recess to lock the rotation of the spool with respect to the spool holder, thereby preventing the elastic member from deflecting during normal fishing.

The braking force measuring mechanism has sufficient strength to withstand tension applied to the line because the blocking member and the engaging recess are subjected to the tension when the line is wound up onto the spool for fishing a hooked fish.

The blocking member is disadvantageous, however, in that it is movably supported to the front surface of the spool holder before the spool, is limited with respect to enlargement of its sectional configuration in order to improve its durability, and also projects outwardly from the reel body resulting in a poor aesthetic appearance and the danger of its catching the line drawn out from the spool.

SUMMARY OF THE INVENTION

An object of the invention is to provide a braking force measuring mechanism for a spinning reel, which has a blocking member for blocking or releasing rotation of the spool with respect to the braking side member subjected to the braking force set by the drag mechanism and has sufficient strength in its overall construction, without projecting outwardly from the reel body, to have a good aesthetic appearance.

The present invention is characterized in that at the outer periphery of the rear portion of the spool body is provided a cylindrical skirt, having an enclosed space formed thereby so that the blocking member is built in the space. In detail, the invention is for use with a spinning reel provided with reel body; a spool shaft supported to the reel body; a spool provided with a fishing line winding body and a cylindrical skirt, disposed around the spool shaft, and supported rotatably relative to the reel body; and a drag mechanism for exerting the braking effect against rotation of the spool. The invention provides an improved braking force measuring mechanism for measuring the braking force set by the drag mechanism in that the braking force measuring mechanism is provided with a braking side member subjected to the braking force applied by the drag mechanism, the spool is rotatably supported to the braking side members, a measuring elastic member for biasing the spool reversely to the direction of drawing out a fishing line wound onto the spool is provided between the braking side member and the spool, a pointer is provided at one of the braking side member and spool a dial indicating the braking force is provided at the other, a retaining portion is provided at the braking side member, in the skirt at the spool is provided a blocking member engageable or disengageable with or from the retaining portion so as to engage with the retaining portion to block rotation of the spool with respect to the braking side member in the direction of drawing out the line, and at the outer periphery of the skirt is provided an operating member for moving the blocking member in the direction of engaging or disengaging with or from the retaining portion.

The above-described construction provides a blocking member and a retaining portion which have sufficient durability to overcome a load on both the members during the fishing of a hooked fish, which ensure locking of the spool against the braking side member, and which do not project outwardly from the reel body, whereby there is no risk that the line will be caught by the blocking member and the spinning reel is enabled to have a good aesthetic appearance.

Accordingly, the braking force set by the drag mechanism is reliably measurable by locking the blocking member with respect to the retaining portion, and for normal fishing, the spool is locked by the blocking member to enable fishing without deflecting the elastic member.

In addition, the braking side member according to the invention provides a spool shaft side member, such as a spool shaft or a spool holder provided non-relative-rotatably thereto, in a spinning reel using a front drag mechanism. Also, in a spinning reel using a front drag mechanism, the invention provides a rotary cylinder which is supported to rotate relative to the spool shaft.

Other objects and aspects of the invention will become apparent from the following description of the various illustrated embodiments with reference to the accompanying drawings.

BRIEF DESCRIPTION OF THE DRAWINGS

FIG. 4 is a sectional view showing operation of a blocking member to lock a spool from the condition shown in FIG. 3, FIG. 5 is a sectional view of a second embodiment of the invention, showing its principal portion only, and FIG. 6 is a sectional view of the second embodiment, corresponding to FIG. 3.

DETAILED DESCRIPTION OF THE PREFERRED EMBODIMENTS

Figure 1:
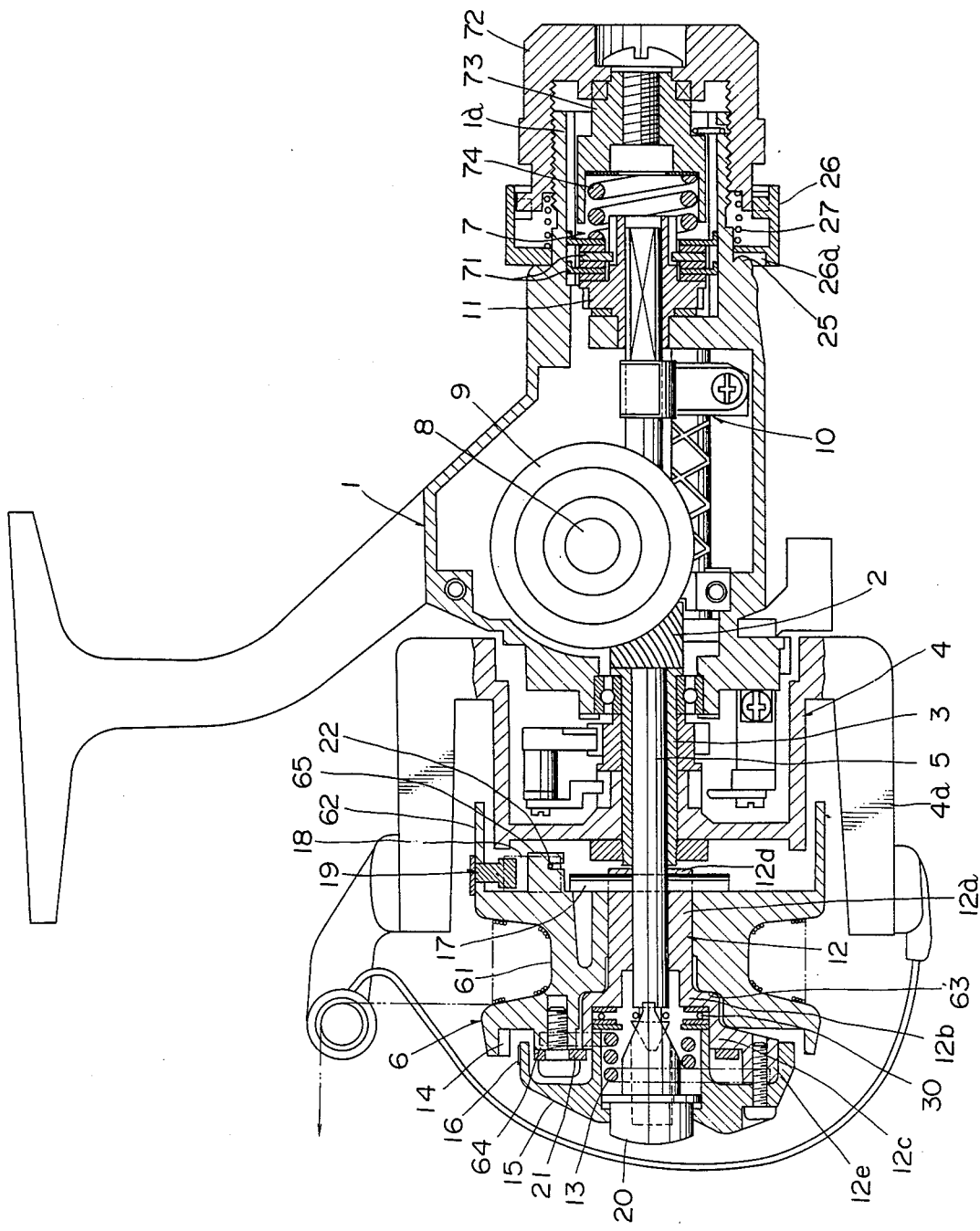
FIG. 1 is a longitudinal sectional view of an entire spinning reel having a braking force measuring mechanism according to a first embodiment of the invention.

Referring to FIGS. 1 through 4, a rear drag type spinning reel is shown which has a drag mechanism provided at the rear of a reel body 1.

Reel body 1 comprises a main body open at one end and a lid for closing the open end. A tubular driving shaft 3 having a pinion 2 is rotatably supported through a bearing into a throughbore provided at the front wall of reel body 1. A rotary frame 4, having a cylindrical portion and a pair of support arms 4a, is mounted on the outer periphery of the utmost end of driving shaft 3. A spool shaft 5 is supported to be rotatably and axially movable in a shaft bore at driving shaft 3. A spool 6 having a line winding body 61 and a cylindrical skirt 62 extending axially outwardly thereof is supported at the utmost end of spool shaft 5. A drag mechanism 7 for applying braking action against rotation of spool shaft 5 is provided between the rear end of spool shaft 5 and the rear portion of reel body 1. A handle shaft 8 extending perpendicularly to driving shaft 3 is rotatably supported to reel body 1 through a bearing. A master gear 9 engageable with pinion 2 is provided at the projecting portion of handle shaft 8 into reel body 1. A handle (not shown) is provided at handle shaft 8 projecting outside reel body 1. In operation, the handle is rotated to drive driving shaft 3 to rotate rotary frame 4, with spool 6 being moved in axial reciprocation through a reciprocation mechanism 10, and with a bail arm supported between support arms 4a guiding a fishing line to be wound onto spool 6.

At the rear surface of reel body 1 are provided a through bore and a fixing cylinder 1a extending rearwardly from the circumference of the through bore. A support cylinder 11 is supported so as to be rotatable only relative to the through bore, and spool shaft 5 is fitted at its rear end into support cylinder 11 so as to be non-rotatable and axially movable relative to support cylinder 11.

Drag mechanism 7 comprises a plurality of drag plates 71 interposed between support cylinder 11 and fixing cylinder 1a, a cylindrical adjustor 72 screwable with fixing cylinder 1a, a pusher 73 position-adjustably supported to adjustor 72, and a drag spring 74 interposed between pusher 73 and drag plates 71. Adjustor 72 is rotated to bring drag plates 71 in press-contact with each other, thereby exerting braking action against rotation of support cylinder 11, and in turn against rotation of spool shaft 5.

A first embodiment of the braking force measuring mechanism shown in FIG. 1, is constructed such that a cylindrical spool holder 12 is supported to be non-rotatable relative to spool shaft 5 and is subjected to the braking action provided by drag mechanism 7. Spool 6 is rotatably supported on spool holder 12. Between spool 6 and spool holder 12 is interposed an elastic member 13 in the form of a coil spring for biasing spool 6 in a direction opposite to the direction of drawing out the line from spool 6. A pointer 14 is provided on spool 6. A holder 15 includes a dial 16 having a plurality of scales indicating the magnitude of the braking force of drag mechanism 7, with the position on the scales corresponding to positions of pointer 14. Holder 15 is provided for a push button 20 supported to spool shaft 5 through spool holder 12. At spool shaft 5 is provided a retaining member 17 extending radially outwardly of spool shaft 5. A blocking member 18 is held within skirt 62 of spool 6 to be movable radially of spool 6. Blocking member 18 is movable between positions at which it is engaged with or disengaged from retaining member 17. When member 18 is engaged with retaining member 18, it blocks rotation of spool 6 in the direction of drawing out the line with respect to spool holder 12. An operating member 19 for moving blocking member 18 between engaged and disengaged positions with retaining member 17 is provided at skirt 62 to be operable from the exterior of the reel.

Figure 3:
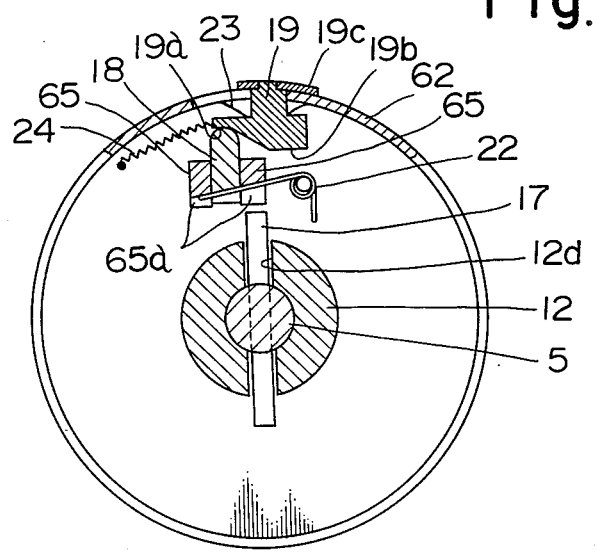
FIG. 3 is a partial sectional view of the braking force measuring mechanism of FIG. 1.

In the above-described construction, spool holder 12 may be integral with spool shaft 5, although in the first embodiment it is separate therefrom and comprises a smaller diameter cylinder 12a having a shaft bore and a larger diameter cylinder 12c in continuation of small diameter cylinder 12a through a stepped portion 12b. Spool 6 is supported rotatably onto smaller diameter cylinder 12a. At the rear end of smaller diameter cylinder 12a is provided a transmitting groove 12d recessed axially frontwardly as shown in FIG. 3. At the front of larger diameter cylinder 12c are provided a pair of support portions 12e having leg portions projecting axially outwardly. Holder 15 holds push button 20 and is mounted to support portions 12e through mounting bolts respectively. Dial 16 has scales provided with numerals and is provided on the outer periphery of the front of holder 15, and projecting pointer 14 is provided at the outer periphery of the front of line winding body 61 at spool 6.

At the front of spool 6 are provided a stepped portion 63 opposite to stepped portion 12b at spool holder 12 and a pair of spring holders 64 projecting axially outwardly of spool 6 and circumferentially opposite to support portions 12e. A connecting ring 21 abutting against the end face of larger diameter cylinder 12c at spool holder 12 is mounted to the end faces of spring holders 64, thereby blocking axial movement of spool 6 and spool holder 12 relative to one another and enabling their relative rotation only.

Figure 2:
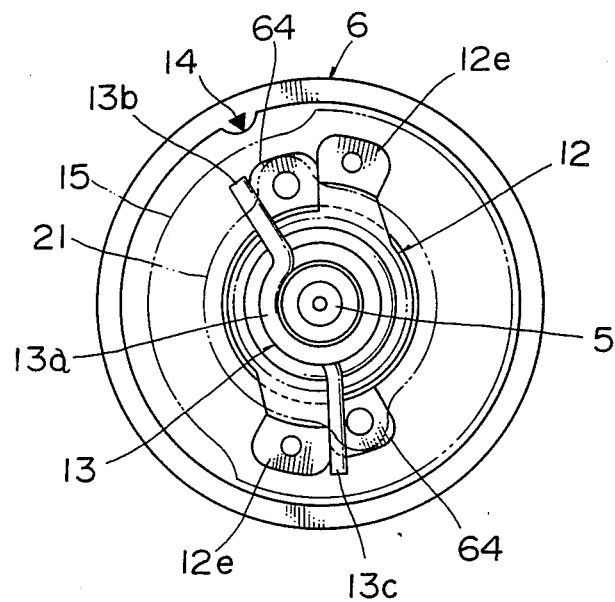
FIG. 2 is a partially omitted front view of the FIG. 1 embodiment, from which a push-button and a holder are removed.

Elastic member 13, as shown in FIG. 2, comprises an intermediate coiled portion 13a and a pair of first and second spring ends 13b and 13c extending radially therefrom. Coiled portion 13a is disposed in the inner space of larger diameter cylinder 12c. First spring end 13b abuts against one spring holder 64, and second spring end 13c abuts against one support portion 12e as shown in FIG. 2.

Retaining member 17 uses a retaining pin passing through spool shaft 5 and projecting radially outwardly from the outer periphery of spool holder 12. This pin engages with transmitting groove 12d to couple spool shaft 5 and spool holder 12 to be nonrotatable relative to one another. The retaining pin extends at its utmost ends radially outwardly from the outer periphery of spool holder 12 as discussed above.

In addition, retaining member 17 may be integral with spool holder 12 without using the retaining pin. Also, retaining member 17, when provided at spool holder 12, as shown in FIG. 6, may be formed of a disc having a cam face as discussed in detail below.

Blocking member 18, as shown in FIG. 3, is held between a pair of guide portions 65 projecting from the rear surface of spool body 61, and between blocking member 18 and the rear surface of spool body 61 is interposed a return spring 22 for biasing blocking member 18 toward operating member 19, in other words, in the direction of disengaging blocking member 18 from retaining member 17. In addition, receiving grooves 65a for receiving therein one end of spring 22 are formed at blocking member 18 and guide portions 65, thereby preventing spring 22 from escaping from blocking member 18.

Operating member 19, as shown in FIG. 3, is provided with a low cam face 19a and a high cam face 19b which engage with the end face of blocking member 18. Member 19 also includes an operating portion 19c outwardly exposed through a guide bore provided at skirt 62. A holding spring 23 preferably in the form of a leaf spring and a return spring 24 are interposed between operating member 19 and the inner surface of skirt 62, so that holding spring 23 holds operating member 19 to skirt 62, return spring 24 biases operating member 19 in the direction of always biasing operating member 19 such that high cam face 19b tends to engage with blocking member 18, so that operating member 19, when released after low cam face 19a engages with blocking member 18, is adapted to automatically return to a rest position by the action of return spring 24. Between stepped portion 12b of spool holder 12 and holder 15 is interposed a ring spring 30 engageable with an annular retaining groove provided at spool shaft 5. Ring spring 30 blocks axial movement of spool holder 12 with respect to spool shaft 5. Also, push button 20 is depressed to expand ring spring 30 in diameter, thereby enabling spool holder 12 to be removed from spool shaft 5.

The spinning reel shown in FIG. 1 is provided at one side surface of the rear portion of reel body 1 with a projecting reference portion 25 and a position setting member 26 having a recessed position setting portion 26a corresponding to reference portion 25 is position-changeably supported to adjustor 72. Position setting portion 26a is coincident with reference portion 25 so as to put adjustor 72 in an optimum position.

In detail, position setting member 26 is formed in a cylindrical shape and is rotatably supported to the outer periphery of the front end of adjustor 72. Between adjustor 72 and position setting member 26 is interposed a compression spring 27 for biasing position setting member 26 toward reference portion 25. Axial splines engageable with each other in the condition where position setting member 26 is biased are circumferentially provided at adjustor 72 and position setting member 26, so that position setting member 26 follows rotation of adjustor 72 and moves against compression spring 27 to disengage the splines from each other, thereby rotating position setting member 26 relative to adjustor 72.

In the fishing reel construction as described above, prior to beginning fishing, adjustor 72 is rotated to provide a preset braking force of drag mechanism 7 corresponding to the kind of fish desired to be caught.

Thereafter, the braking force set by drag mechanism 7 is measured by the aforesaid braking force measuring mechanism such that operating member 19 is moved in the direction of engaging low cam face 19a with blocking member 18, blocking member 18 is moved in the direction of disengaging from retaining member 17, and, as shown in FIG. 3, spool 6 is released from the blocking action of spool holder 12. Also, the line wound onto spool 6 is drawn out therefrom, whereby spool 6 rotates against elastic member 13 in the direction of drawing out the line with respect to spool holder 12. When a restoring force of elastic member 13 reaches a point at which it is larger than a force equivalent to the braking force set by drag mechanism 7, spool shaft 5 overcomes the braking force set by drag mechanism and rotates together with spool 6.

At this point, the scale at dial 16 coincident with pointer 14 when spool shaft 5 rotates together with spool 6 is read, thereby enabling the braking force set by drag mechanism 7 to be accurately measured.

In this embodiment, operating member 19 is easily operable from outside spool 6, and blocking member 18 is provided within skirt 62 and does not project outwardly therefrom, thus avoiding any risk that member 18 will catch the line drawn out from spool 6.

Operating member 19 is operated to disengage blocking member 18 from retaining member 17. Spool 6 is rotated against elastic member 13 and thereafter operating member 19 is released. Then, operating member 19 automatically returns to the position where high cam face 19b engages with blocking member 18 by the action of return spring 25 as shown in FIG. 4, whereby, after the braking force is measured and confirmed, the rotation of spool 6 can be locked with respect to spool holder 12 in a range of one rotation of spool 6 without intentionally operating operating member 19. Accordingly, elastic member 13, even when spool 6 rotates, is not deflected and rotates together with spool holder 12, whereby spool 6 can be reliably prevented from rotating due to any force smaller than the braking force set by drag mechanism 7 due to tension applied to the line when a fish is hooked.

After the braking force of drag mechanism 7 is measured, operating member 19 is released to lock spool 6 with respect to spool holder 12, and position setting member 26 is rotated with respect to adjustor 72 so as to coincide with reference portion 25. Hence, even when adjustor 72 is rotated corresponding to a pulling force of the hooked fish and the braking force of drag mechanism 7 is changed to catch a fish which has been hooked, after the fishing operation, adjustor 72 is returned to the position where position setting portion 26a coincides with reference portion 25, thereby being easily and accurately positioned to obtain the previously set braking force.

Hence, the spinning reel using a braking force mechanism of the invention is convenient to use and provides good results in terms of number of fish caught. Also, reference portion 25 engages with position setting portion 26a to prevent excessive reduction of the braking force, thereby preventing the line wound on spool 6 from getting entangled. Also, position setting member 26 biased by compression spring 27 can generate a sound when position setting portion 26a engages with reference portion 25, whereby an angler hears the sound to check the return of adjustor 72 to its proper position.

Alternatively, pointer 14 may be mounted on holder 15 and dial 16 on spool 6. Also, spool 6 may be directly mounted onto spool shaft 5. In this embodiment, elastic member 13 is interposed between spool 6 and spool shaft 5, with pointer 14 being provided at one of spool 6 and spool shaft 5, and dial 16 at the other.

Alternatively, elastic member 13, which is in the form of a coiled spring, may be constructed such that it becomes reduced in diameter following rotation of spool 6, which is not especially limited in construction.

Also, blocking member 18 may alternatively be pivoted at one end to the end surface of line winding body 61 so as to move as a whole in the rotating direction around the pivot portion.

Operating portion 19c of operating member 19 may alternatively be constructed such that it does not project outwardly from skirt 62.

Reference portion 25 and position setting member 26 are not essential to the invention. Also, they may be reversely provided and may not engage but coincide with each other as discussed above.

The braking force measuring mechanism of the invention can be applied to a front drag type spinning reel which is provided at spool 6 with a drag mechanism as shown in FIG. 5.

The front drag type spinning reel shown in FIGS. 5 and 6 is constructed such that a spool shaft 5A is supported to be nonrotatable and axially movable relative to a reel body. A sleeve 50 is supported non-rotatably to the fore end of spool shaft 5A. A rotary cylinder 51 is rotatably supported onto the outer periphery of sleeve 50. Rotary cylinder 51 has a cylinder inserted into the center of the line winding body of spool 6A and a flange extending radially outwardly from one end of the cylinder and abutting against the front surface of the line winding body. Spool 6A is rotatably supported to rotary cylinder 51, and a drag mechanism 7A is provided between the inner surface of rotary cylinder 51 and spool shaft 5A so as to exert a braking force against rotation of rotary cylinder 51, and an elastic member 13A is interposed between spool 6A and rotary cylinder 51 so as to transmit the rotation of spool 6A in the direction of drawing out the line to rotary cylinder 51 through elastic member 13A. At the surface of the flange of rotary cylinder 51 is provided a dial 16A having a plurality of scales, with a pointer 14A being provided at the front surface of the line winding body. Also, a retaining portion 17A is alternatively integral with sleeve 50 or integrally supported thereto by a separate member. A blocking member 18A is movably provided in a skirt 62A at spool 6A through a pair of guide elements 65A provided at the rear surface of spool body 61A, and an operating member 19A is provided at skirt 62A the same as in the first embodiment.

Referring to FIG. 6, the relationship between blocking member 18A in the second embodiment in FIG. 5 and retaining portion 17A engageable with or disengageable from blocking member 18A is shown. Retaining portion 17A in FIG. 6 is formed of a disc 52 separate from sleeve 50 and has at the outer periphery of disc 52 a cam face 52a.

In addition, in FIGS. 5 and 6, reference numeral 72A designates an adjustor of drag mechanism 7A, 22A designates a return spring for blocking member 18A, and 23A designates a holding spring for blocking member 19A and 24A designates a return spring for operating member 19A.

The second embodiment shown in FIGS. 5 and 6 can measure by operation of operating member 19A the braking force set by the drag mechanism 7A the same as in the first embodiment. Also, the blocking member 18A engages with retaining portion 17A, thereby enabling fishing without deflecting elastic member 13A.

As seen from the above, the present invention is constructed such that the spool is rotatably operated against the elastic member in the direction of drawing out the fishing line, thereby enabling the braking force of the drag mechanism to be easily and accurately measured. The retaining member is provided at the braking side member, such as the spool shaft or the rotary cylinder, subjected to the braking action by the drag mechanism. In the skirt of the spool is provided a blocking member engageable with or disengageable from retaining portion 17A so as to engage therewith to block the rotation of spool in the direction of drawing out the line with respect to the braking side member. At the skirt is provided an operating member for movably operating the blocking member in the direction of engaging with or disengaging from the retaining portion, whereby the retaining member and blocking member can have sufficient strength, can reliably block the rotation of spool in the direction of drawing out the line with respect to the braking side member, and can eliminate outward projection of the blocking member. Hence, the blocking member does not obstruct operation of the reel, is convenient to operate, and never catches the line.

Although several embodiments have been described above, they are merely exemplary of the invention and not to be construed as limiting, the invention being defined solely by the appended claims.

What is claimed is:

1. A spinning reel comprising:
   a reel body;
   a spool shaft supported to said reel body;
   a spool provided with a fishing line winding portion and a cylindrical skirt, said spool being disposed around said spool shaft and supported to be rotatable relative to said reel body;
   a drag mechanism for applying a braking force against rotation of said spool; and
   a braking force measuring mechanism for measuring a braking force set by said drag mechanism and being provided with
   (i) a braking side member subjected to the braking force set by said drag mechanism; said spool being supported to be rotatable relative to said braking side member;
   (ii) a measuring elastic member provided between said braking side member and said spool and biasing said spool in a direction opposite to a direction of drawing out from said spool a fishing line wound thereon;
   (iii) a pointer provided at one of said braking side member and said spool;

(iv) an indicating portion for indicating a magnitude of the braking force and provided at the other of said braking side member and said spool;

(v) a retaining portion provided at said braking side member;

(vi) a blocking member provided within said skirt at said spool and engageable with or disengageable from said retaining member so as to engage therewith to block rotation of said spool with respect to said braking side member in the direction of drawing out the fishing line; and (vii) an operating member provided at the outer periphery of said skirt and movably operating said blocking member in the engaging or disengaging direction with respect to said retaining portion.

2. A spinning reel according to claim 1, wherein said spool shaft is support to be rotatable and axially movable relative to said reel body and said drag mechanism is mounted to said reel body so as to exert the braking force against said spool shaft, wherein said spool shaft is provided with a spool holder for rotatably supporting said spool, said measuring elastic member is interposed between said spool holder and said spool rotatably supported thereto, and said spool shaft is provided with said retaining portion projecting radially outwardly from the outer periphery of said spool holder.

3. A spinning reel according to claim 2, wherein said retaining portion comprises a retaining pin passing through said spool shaft.

4. A spinning reel according to claim 1, wherein said spool shaft is supported to be non-rotatable and axially movable with respect to said reel body and said drag mechanism is disposed at the axial front portion of said spool shaft, wherein a rotary cylinder is provided at the axial front portion of said spool shaft and subjected to the braking force set by said drag mechanism, said spool is rotatably supported to said rotary cylinder, said measuring elastic member is interposed between said rotary cylinder and said spool, and said rotary cylinder is provided with said retaining portion projecting radially outwardly of said rotary cylinder.

5. A spinning reel according to claim 4, wherein said retaining portion comprises a disc having a cam face and provided at said rotary cylinder.

6. A spinning reel according to claim 1, wherein a guide and a spring are provided at the rear surface at said line winding portion of said spool, said guide extends radially of said line winding portion so as to slidably guide said blocking member and said spring biases said blocking member in the direction of disengaging from said retaining member with respect to said retaining portion, said operating member has cam faces engageable with the outer surface of said blocking member and is disposed outside said blocking member, and said operating member is circumferentially movably supported to said skirt at said spool.

* * * * *